Sept. 12, 1939.  C. L. COOK  2,172,435
POTATO DIGGER
Filed Feb. 25, 1937  2 Sheets-Sheet 1
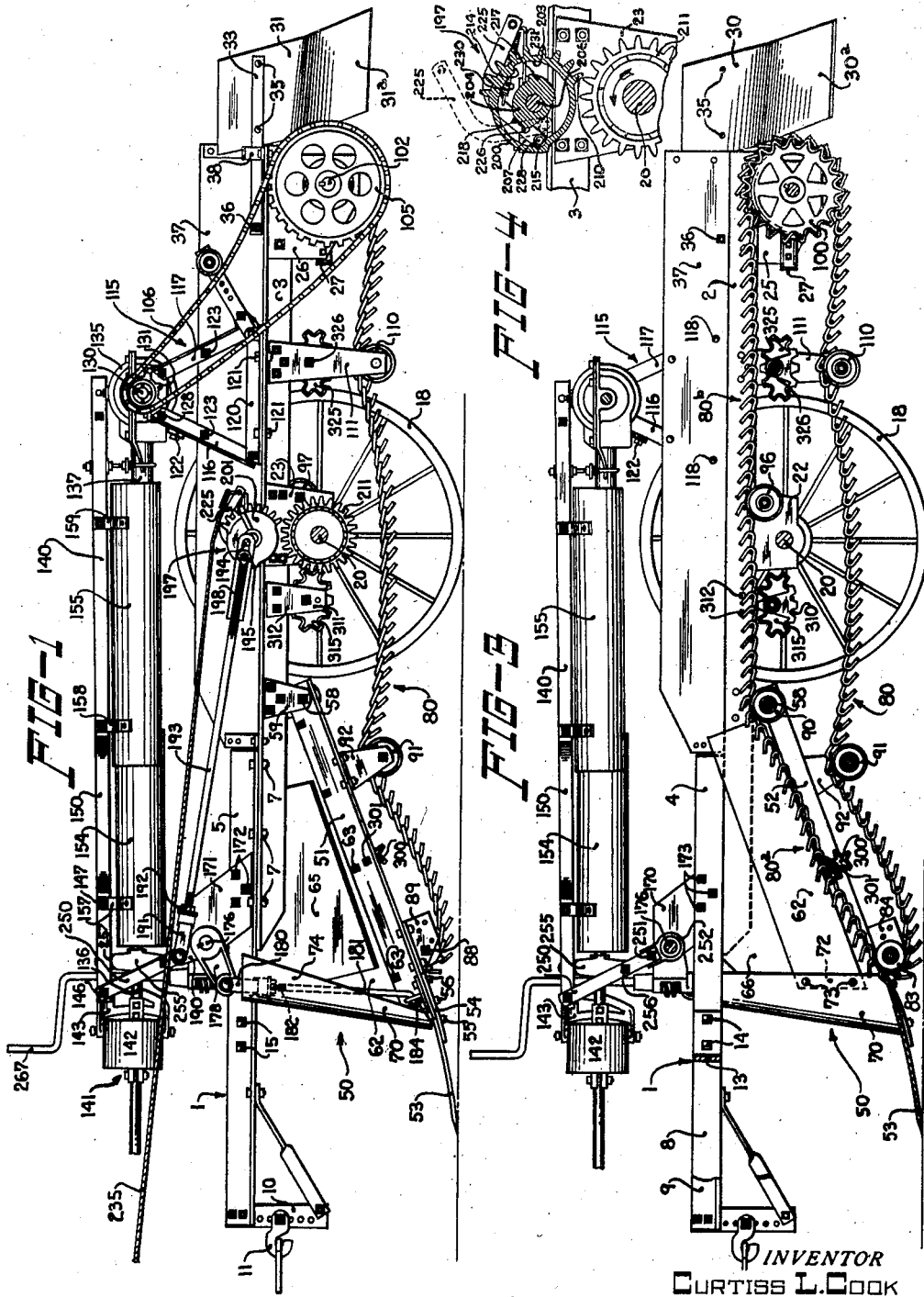
INVENTOR
CURTISS L. COOK
BY
ATTORNEYS

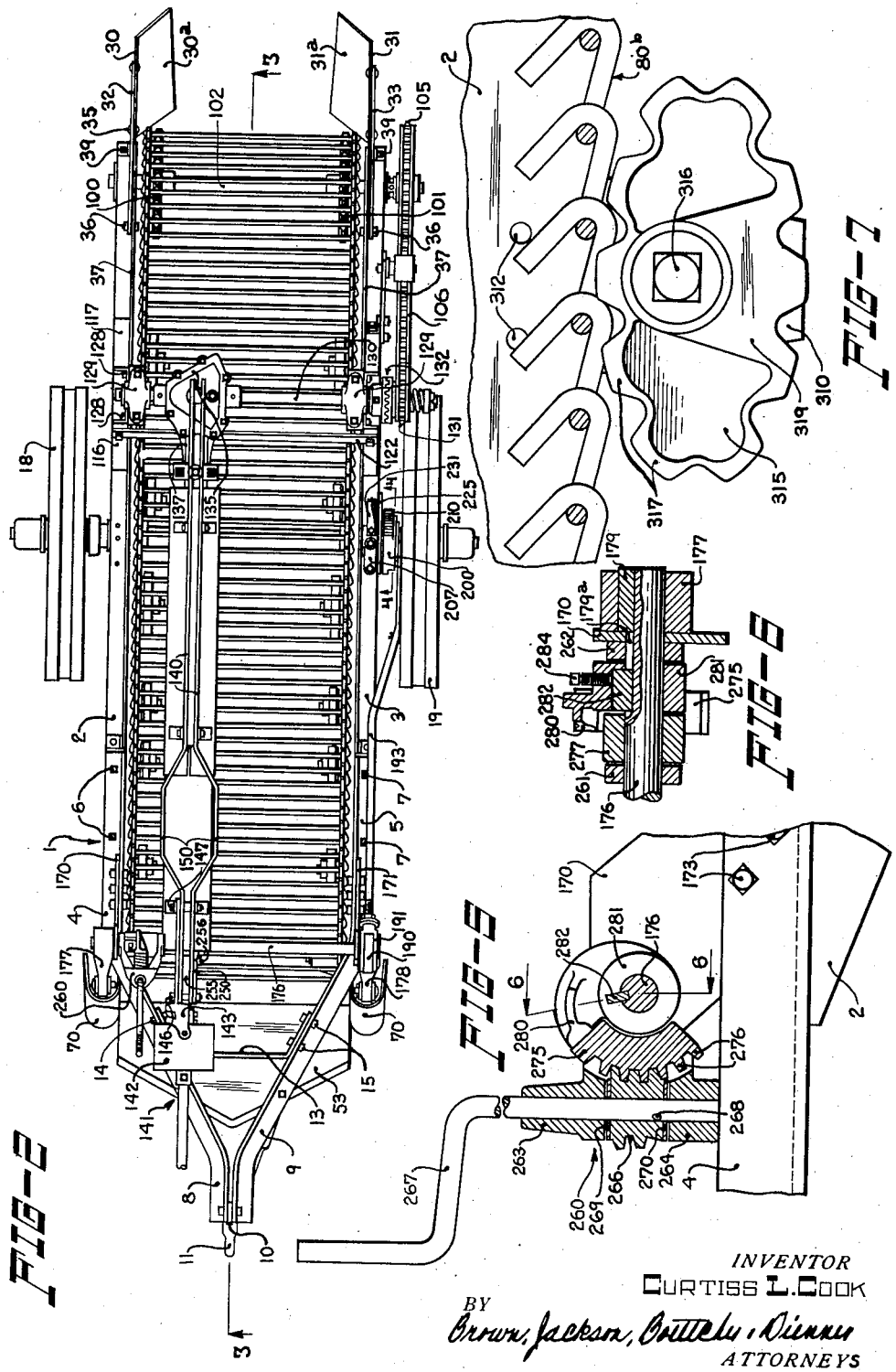

Patented Sept. 12, 1939

2,172,435

UNITED STATES PATENT OFFICE 2,172,435

POTATO DIGGER

Curtiss L. Cook, Syracuse, N. Y., assignor to Syracuse Chilled Plow Co., Inc., Syracuse, N. Y., a corporation of New York Application February 25, 1937, Serial No. 127,659

28 Claims. (Cl. 55—51)

The present invention relates generally to potato diggers and the like, in which potatoes and other root crops are removed from the ground by broad shovel units that lift the soil and crop up onto a movable elevator chain that has open spaces and is sometimes agitated so as to cause the soil to be shaken loose from the crop during the passage of the latter through the machine and prior to its discharge into a row on top of the ground in rear of the machine.

The principal object of the present invention is the provision of a potato digger or other machine of this type in which a rigid horizontal frame carries a vertically shiftable shovel unit and in which a single endless elevator, preferably of the rod type, has one section carried horizontally on said frame and another section carried by said shovel unit and movable with respect to the first section when the shovel unit is shifted vertically. The principal advantage of this construction is that rolling and bruising of the potatoes, or other crop, is practically entirely eliminated, the only inclined section of the elevator being that leading from the shovel onto the horizontal portion of the elevator, and this inclined portion of the latter is the part on which a substantial amount of soil still adheres to the potatoes, so that for this reason very little rolling occurs. A greater portion of the cleaning takes place on the inclined section, so that by the time a substantial amount of soil has been shaken loose from the potatoes the latter have reached the horizontal section of the elevator, and being horizontal there is little tendency for the potatoes to roll around and become bruised. The above advantages of a level bed implement are not present in prior art constructions in which the elevator or elevators are either inclined upwardly or downwardly. Another advantage of the level bed machine, constructed according to the principles of the present invention, is that the machine can be operated either up or down a slope without appreciably increasing the tendency for the potatoes to roll, such as will occur when a machine embodying inclined elevators is employed on slopes.

Another object of the present invention is the provision of a potato digger in which the frame of the machine is substantially horizontal at all times with only the shovel unit adjusted vertically for determining the operating depth of the shovel or its movement into and out of a transport position, and in which the substantially horizontal frame carries deflectors at the rear thereof which are rigidly and permanently fastened thereto and which have a fixed angle, by virtue of which latter construction the necessity for adjusting the angle of the deflectors is eliminated. In machines in which the vertical position of the shovel unit is adjusted by swinging the entire frame about a transverse axis, it is frequently necessary to also adjust the position of the deflecting means to correspond to the angular position of the machine frame. According to the present invention, this disadvantage has been eliminated.

Another important object of the present invention is the provision of agitating means for the elevator and in which the agitating means is so constructed that the elevator may be agitated at a greater frequency and a less amplitude than formerly, resulting in more efficient removal of the soil from the potatoes and with less bruising and damage thereto. In this connection it is a further object of the present invention to provide agitating means so constructed and arranged as to provide for periodic changes in the frequency and amplitude of the agitation, producing an uneven movement of the elevator and resulting in improved cleaning of the crop.

A further object of the present invention is the provision of a potato digger or similar machine that is lower and more stable than former machines.

Another object of the present invention, particularly in connection with a level bed machine in which the main frame is maintained generally horizontal and in which the shovel unit is adjustable relative to the main frame, is the provision of new and improved means for raising and lowering the shovel unit relative to the main frame and associated parts.

These and other objects and advantages of the present invention will be apparent to those skilled in the art after a consideration of the following detailed description of the preferred construction, taken in conjunction with the accompanying drawings illustrating such construction.

In the drawings:

Figure 1 is a side view of a potato digger embodying the principles of the present invention, with the near carrying wheel removed in order to better illustrate the parts of the machine;

Figure 2 is a top view of the machine shown in Figure 1;

Figure 3 is a longitudinal vertical section taken substantially along the line 3—3 of Figure 2;

Figure 4 is a section taken substantially along the line 4—4 of Figure 2 through the power lift for raising and lowering the shovel unit by power derived from the carrying wheels;

Figure 5 is an enlarged view, partly in section, illustrating the adjusting mechanism for determining the operating position of the shovel unit;

Figure 6 is a section taken along the line 6—6 of Figure 5; and

Figure 7 is an enlarged view showing the details of one of the agitating cams embodying the principles of the present invention.

Referring now more particularly to Figures 1, 2 and 3, the frame of the machine is indicated in its entirety by the reference numeral 1 and consists of two generally longitudinally extending frame bars 2 and 3 of angle iron construction disposed with their horizontal flanges extending laterally outwardly and their vertical flanges extending downwardly, and front frame bars 4 and 5 bolted as at 6 and 7 to the front ends of the frame members 2 and 3 and converging forwardly, as at 8 and 9, being bolted at their forwardly converged ends to a hitch plate 10 of any suitable construction. The latter is adapted to be connected with or carry a part 11 by which the front end of the machine is arranged to be supported, either on the drawbar or other part of a propelling tractor, or on a suitable foretruck, as desired. The front frame bars 4 and 5 are reinforced by a transverse member 13 which has rearwardly bent ends bolted, as at 14 and 15, to the vertical legs or flanges of the frame bars 4 and 5.

Although the weight of the front end of the machine is adapted to be supported either on the source of draft or on a separate foretruck, the weight of the principal portion of the frame and associated parts is carried on a pair of supporting wheels 18 and 19 mounted on a solid axle 20. The axle 20 is connected with the vertical legs of the longitudinal frame bars 2 and 3 by suitable brackets 22 and 23, and the rear ends of the longitudinal frame bars 2 and 3 have brackets 25 and 26 securely attached thereto, as by bolts, the brackets at opposite sides of the rear of the frame being connected together by a transverse frame member 27. A pair of deflectors 30 and 31 are rigidly and permanently fastened to the rear of the frame 1 by suitable strap members 32 and 33 that are riveted, as at 35, to the deflectors, and the strap members are pivoted for generally vertical swinging movement by bolts 36 to side plates 37 that are carried by the frame bars 2 and 3. Normally, however, the deflectors remain in fixed position with respect to the frame of the machine, being held in this position by clips 38 that are bolted to the horizontal flanges of the frame members 2 and 3, as indicated at 39 in Figure 2. The deflectors 30 and 31 include angled portions 30a and 31a which serve to bunch the potatoes so as to deposit them in a relatively narrow row rearwardly of the machine.

The shovel unit of the machine is indicated in its entirety by the reference numeral 50 and comprises a frame made up of a pair of angle members 51 and 52 to the lower end of which a pointed shovel 53 is connected, as by connecting strap members 54 bolted, as at 55 and 56, to the shovel 53 and to the laterally outwardly disposed legs or flanges of the arms or angle members 51 and 52. The rear ends of the shovel arms 51 and 52 are pivotally connected, as by bolts 58, to brackets 59 that are fastened to the vertical flanges of the frame bars 2 and 3 adjacent the forward ends of the latter. The shovel unit 50 is capable of vertical swinging movement about the axis defined by the pivot bolts 58. A plate 62 is bolted, as at 63, to each side of the shovel unit 50, the bolts 63 being disposed in openings spaced along the upper edge of the vertical flange of each of the shovel arms 51 and 52 as best shown in Figure 1, and the plates 62 are disposed in movable overlapping relation with respect to companion plates 65 and 66. The plate 65 at the left hand side of the machine is provided with an outturned flange that is secured between the horizontal flanges of the frame members 3 and 5 by the connecting bolts 7, as shown in Figure 1, and the plate 66 at the other side of the machine (Figure 3) is preferably attached to the frame in the same manner. The throat of the shovel unit 50 is defined by a pair of curved plates or guard members 70, each of which is disposed in a generally vertical position and has a laterally inner edge 72 riveted or bolted, as at 73, to the forward end of the associated shovel plate 62. The opposite edge of each of the curved members extends laterally outwardly and then rearwardly, as at 74 (Figure 1), and embraces and protects a portion of the raising and lowering means described below. The throat or guard members 70 move vertically with the shovel unit 50, and the lower bolts or rivets 73 (Figure 3) serve to connect the members 70 to the associated shovel arms 51 and 52.

The elevator of the potato digger constructed according to the principles of the present invention preferably comprises a single endless chain or belt of transversely disposed rods of more or less conventional construction so far as the elevator itself is concerned. The elevator is indicated in its entirety by the reference numeral 80, and as best shown in Figure 3 it includes a forward section 80a one side of which is trained over a roller 83 mounted for rotation on a stud or bearing sleeve carried by or fixed to a bracket 84 fastened to the lower end of the frame bar 52, preferably closely adjacent to the rear of the shovel 53. The other side of the shovel unit section 80a of the elevator is trained over a similar roller mounted, as at 88, on a bracket 89 which is similar to the bracket 84. The brackets 84 and 89 are preferably bolted to the laterally outwardly extending lugs or flanges of the shovel arms 51 and 52. A second pair of rollers 90 are journaled in any suitable manner on the pivot bolts 58, about the axis of which the shovel unit 50 is adapted to swing vertically, and the lower or idle run of the elevator section 80a is supported on a third pair of rollers 91 supported for rotation by brackets 92 which are also bolted to the outwardly disposed flanges of the shovel arms 51 and 52.

Rearwardly of the elevator section 80a, which takes substantially the same inclination as the shovel unit 50, the upper run of the elevator 80 is supported in a horizontal position parallel with respect to the horizontal frame of the machine. The horizontal portion of the elevator is indicated by the reference numeral 80b and is maintained in horizontal position by a pair of rollers 96 and 97 supported for rotation on the brackets 22 and 23, respectively. The rear portion of the elevator passes around a pair of drive sprockets 100 and 101 which are fixed in any suitable manner to a drive shaft 102 that is mounted for rotation in the rear brackets 25 and 26. The left end of the drive shaft 102 is extended, as shown in Figures 1 and 2, and receives a sprocket 105 that is suitably fixed thereto and around which a driving chain 106 is trained. The lower or idle run of the elevator section 80b is supported by a pair of rollers 110 supported for rotation at the lower ends of a pair of brackets 111 that are bolted to the frame bars 2 and 3 intermediate the brackets receiving the axle shaft 20 and those supporting the driving shaft 102.

The drive shaft 102 and driving chain 106 may, if desired, be driven from the ground wheels 18 and 19 by any suitable connections, but where the machine is particularly adapted for tractor use, preferably suitable connections are provided for driving the elevator 80 by power derived from the tractor that propels the machine, the operation of the elevator 80 being then independent of the traction at the wheels 18 and 19.

Referring now more particularly to Figure 1, an upwardly disposed bracket member 115 is provided at each side of the machine, just rearwardly of the axle shaft 20, and each bracket consists of a pair of angles 116 and 117 that extend downwardly in diverging relation and at their lower ends are bolted at 118 to a horizontal angle member 120, the latter being bolted at 121 to the horizontal flange of the associated frame bar. A transverse member 122 connects the upper ends of the angles 116 at opposite sides of the machine, and if desired the side plates 37 may also be bolted, as at 123, to the bracket angles 116 and 117. The upper end of each of the latter angles at each side of the machine is bolted, as at 128, to a bearing member 129 in which a transverse shaft 130 is journaled for rotation. One end of the shaft 130 extends laterally outwardly and carries a pinion 131 over which the driving sprocket chain 106 is trained and by which it transmits power to the driving sprocket 105. An overload release mechanism 132 serves to protect the parts from abnormal stresses.

The shaft 130 extends into a transmission casing 135 and is driven through suitable gearing (not shown) from a longitudinal power takeoff shaft 136 (Figure 1) the rear end of which is mounted for rotation within a torque tube 137 that is suitably connected to or forms a part of the gear housing 135. The housing 135 is mounted for rotation about the axis of the shaft 130, and a torque arm or brace 140 is fastened at its rear end to the casing 135 and the torque tube 137 and extends forwardly to a point near the front of the machine in generally parallel relation to the power takeoff shaft 136. The latter includes a universal joint section, indicated by the reference numeral 141, around which the cylindrical shield 142 is disposed and which is fastened to a yoke 143 suitably connected to the forward end of the torque brace 140, as by bolts 146 and 147, forwardly of the spaced apart portions 150 of the torque bars 140 which accommodate a change speed transmission in case it is desired to install such a unit in order to provide for any desired degree of agitation. Telescopic tubular guards 154 and 155 are supported by clips 157, 158 and 159 from the torque arm 140, and in the event that a change speed transmission is mounted on the torque arm 140, the forward tubular guard section 154 may be removed.

The shovel unit 50 is raised and lowered by means including a rock shaft which serves also to support the forward end of the torque arm 140. Referring now more particularly to Figures 1 and 3, brackets or plates 170 and 171 are bolted as at 172 and 173 or otherwise secured to the forward frame bars 4 and 5 and are apertured to support a rock shaft 176 that extends transversely of the machine and carries arms 177 and 178 (Figure 2) at its outer ends. Each arm is secured to the rock shaft 176 in any suitable manner, as by a key 179 disposed in a slot 179a as best shown in Figure 6. The outer end of the arm 178 at the left hand side of the machine is pivotally connected to the upper end of a yoke 180 (Figure 1) and to the latter the upper end of a link 181 is adjustably connected, as by a nut 182, the lower end of the link 181 having a hook end that is engaged in an apertured lug forming a part of a bracket 184 that is bolted to the forward end of the shovel arm 51 by the bolts 56 that fasten the strap 54 to the arm 51. At the other side of the machine the lifting arm 177 is link connected to the forward end of the other shovel arm 52 in substantially the same manner.

The rock shaft 176 is preferably actuated by power derived from one of the supporting wheels, and to this end the lifting arm 178 is formed with a lug 190 serving as a second arm for the rock shaft 176, and a yoke 191 is pivoted to the arm 190 and is adjustably connected, as at 192, to the forward end of a longitudinally disposed link 193, the rear end of which is slotted, as at 194, and engages a pin 195 which is carried on and forms a part of the power lift unit, indicated in its entirety by the reference numeral 197. A spring 198 is connected at its forward end to the link 193 and at its rear end to the pin 195 so that the latter always tends to occupy a forward position in the slot 194.

The power lift unit 197 includes a rotatable member 200 and has a solid outer face 201 (Figure 1) and laterally inwardly directed flange and hub sections 203 and 204 (Figure 4). The hub section 204 is journaled for rotation on a stub shaft 206 carried in fixed relation on the frame bar 3 by any suitable means, such as a bracket 207 (Figure 2). The flange section 203 is in the nature of a mutilated gear having a number of gear teeth 210 adapted to mesh with a driving power lift gear 211 fixed to rotate with the ground wheel 19 at all times. The inner periphery of the laterally inwardly directed flange 203 is provided with a pair of shoulders 214 and 215 disposed diametrically opposite one another and adjacent radially outwardly extending cam portions 217 and 218 formed on the hub 204. A control lever 225 is pivoted at 226 (Figure 4) on the bracket 207 and has a roller 228 extending laterally outwardly into the space between the hub 204 and the laterally inwardly directed flange 203 on the power lift gear 200. A spring 230 is anchored at one end to the lever 225 and is connected at the other end to a bracket 231 fixed to the frame of the machine in any suitable manner. The spring 230 is arranged to hold the trip lever 225 in the position shown in full lines in Figure 4 in which the roller 228 engages one of the shoulders on the inner periphery of the laterally inwardly directed flange 203, the roller 228 engaging the shoulder 215 when the parts are in the position shown in Figure 4. A cable 235 (Figure 1) is attached at its rear end to the lever 225 to enable the operator to control the power lift from his position on the tractor.

The operation of the power lift described above is substantially as follows:

When the operator pulls on the cable 235, the trip lever 225 is swung forwardly into the dotted line position shown in Figure 4. This disengages the roller 228 from the shoulder 215 and brings the roller 228 into engagement with the cam hub 204 and causes the power lift gear 200 to be rotated through a slight angle against the action of the spring 198 so as to bring the first of the teeth 210 into a position to be engaged by the teeth on the ground wheel gear 211. The rotation of the wheel drives the gear 211 in the direction of the arrow shown in Figure 4 and this, in turn, rotates the gear member 200 in a clockwise direction as viewed in Figures 1 and 4, exerting a pull on the link 193 and rocking the shaft 176 in a clockwise direction, thereby lifting the shovel unit 50 into its upper position. By this time the operator has released the pull on the cable 235 so that when the gear 211 has driven the power lift gear 200 through substantially 180° the shoulder or notch 214 is in a position to engage the roller 228 after the last of the teeth 210 has cleared the teeth 211 and the gear member 200 has rotated a slight amount further in the same direction under the influence of the spring 198 and the weight of the shovel unit 50. When the cable 235 is again pulled, the roller 228 is released from the notch 214, and the shovel 50 lowers, by virtue of its own weight, pulling the power lift gear 200 around again to the position shown in Figure 4, this position being limited by the engagement of the notch or shoulder 215 against the roller 228 on the trip lever 225.

The rock shaft 176, controlled by the power lift mechanism just described, in addition to raising and lowering the shovel unit 50 serves as means for supporting the forward end of the power takeoff shaft. Referring now more particularly to Figures 1 and 3, the forward ends of the torque bars 140 are bolted to a pair of generally vertically arranged links 250, the lower ends of which are fastened, as by a bolt 251, to a casting 252 which is disposed about the rock shaft 176, whereby the latter serves to support the torque arms 140 and associated parts. The forward portion of the power shafting is carried in a bearing member 255 having upper and lower portions, the lower portion being bolted, as at 256, to the links 250 while the upper portion is disposed in between and has shoulders 257 receiving the forward ends of the torque arms 140. From the above description it will be noted that the rocking movement of the shaft 176 does not in any way affect the proper support of the torque arms 140.

In order to determine the proper operating position of the shovel unit 50, the rocking movement of the shaft 176 under the influence of the weight of the shovel unit 50 is limited by means that will now be described. A casting, indicated in Figure 5 in its entirety by the reference numeral 260, is provided with a pair of arms 261 and 262 (Figure 6) which are apertured and embrace the rock shaft 176, and at its forward end the casting 260 is provided with upper and lower portions 263 and 264 (Figure 5) between which a worm 266 is disposed. The upper and lower casting sections 263 and 264 are bored to receive the lower end of a hand crank 267 to which the worm 266 is fixed in any suitable manner, as by a pin 268. Thrus bearings 269 and 270 are disposed between the worm 266 and the upper and lower casting portions 263 and 264. Meshing with the worm 266 is a worm gear sector 275 that is provided with teeth 276 meshing with the teeth on the worm 266, and the worm gear sector 275 has an arm portion 277 (Figure 6) that is mounted for rotation on the shaft 176. The upper end of the worm gear sector 275 serves as an adjustable stop or abutment for an arm 280 (Figure 5) that is mounted integrally with a collar or hub 281 that is fixed to the rock shaft 176 in any suitable manner, as by a key 282 that is disposed in the same slot 179a in the shaft 176 which receives the key 179. A set screw 284 serves to fix the arm 280 in position and to hold the key 282 in place.

The operation of the adjusting mechanism for the shovel unit is substantially as follows. Rotating the crank 267 in one direction or the other raises or lowers the stop sector 275, so that when the power lift is tripped to permit the shovel unit 50 to lower the movement of the unit in this direction is limited by the engagement of the arm 280 against the upper face of the sector 275. The operating position of the shovel 53 may, therefore, be raised or lowered at any time by rotating the crank 267 in the proper direction.

It is desirable to agitate the crop elevator for the purpose of shaking soil and the like from the potatoes or other crop being dug, and to this end a pair of agitating sprockets 300 are provided for the inclined portion 80a of the endless elevator 80. One sprocket 300 is mounted at each side of the shovel unit, being journaled on a sleeve or bearing fastened to the associated shovel arm by a bolt 301 or the like. It will be observed that as the elevator is driven, the rods will engage the sprockets 300, and since the latter is pivoted off-center, the elevator section 80a will be given a certain amount of agitation, depending upon the eccentricity and the size of the sprockets 300.

In some cases it may also be desirable to agitate the horizontal run 80b of the elevator 80, and to this end other agitating sprockets or cams are provided for cooperation with the elevator 80. Forward of the supporting axle 20 and rearwardly of the brackets 59, is a pair of downwardly extending brackets 310 and 311 which are bolted, as at 312, to the vertical flanges of the frame members 2 and 3. Each of the brackets 310 and 311 carries an elliptical agitating cam or sprocket 315, best shown in Figure 7, which illustrates the agitating sprocket that is mounted on the right hand bracket 310. Referring now to Figure 7, each agitating sprocket or cam 315 is mounted for rotary movement on the bracket 310 and is held in position for such rotation by any suitable means, such as a bolt 316. The agitating sprocket 315 includes a plurality of teeth 317 whereby when the elevator engages the sprocket 315, the latter will be driven as the elevator is moved rearwardly with the crop of potatoes thereon. The axis of rotation of the sprocket 315, defined by the bolt 316, is disposed on the minor axis and spaced from the major axis of the ellipse and closer to one edge of the sprocket 315 than to the other edge. Also, the sprocket 315 carries a weight or thickened section 319 which causes the sprocket 315 to tend to hang in the position shown in Figure 7. In addition to the agitating sprockets 315, other agitating sprockets 325 are pivoted, as at 326, to the upper portions of the brackets 311 that carry the idle rollers 110 for the lower run of the elevator. The sprockets 325 are preferably of exactly the same construction as the sprocket 315 in Figure 7, and hence a further description of these parts is unnecessary.

According to the principles of the present invention, and as illustrated in Figure 3, the sprockets 315 and 325 are so disposed that when the elevator runs idle or under light load it clears entirely the sprockets 315 and 325, so that the latter are not rotated and do not, therefore, agitate the horizontal section 80b of the elevator 80. Under conditions where the agitators 300 at the forward end of the machine are sufficient to remove practically all of the soil from the potatoes or other crop, the weight of the material on the horizontal run 80b of the elevator is not sufficient to cause the elevator rods to engage or rotate the sprockets 315 and 325. Thus, when no agitation is needed, the agitating sprockets 315 and 325 automatically remain out of operation and do not cause any agitation of the elevator. However, under other conditions in which a considerable quantity of soil adheres to the potatoes after they pass the pivot rollers 90 and enter upon the horizontal run 80b of the elevator, the weight of the material on the latter is sufficient to cause the rods thereof to engage the teeth on either or both pairs of the sprockets and hence the latter come into operation automatically and cause agitation of the elevator. From Figure 3 it will be noted that the forward pair of agitators 315 are spaced closer to the elevator than the rear pair of agitators 325. By virtue of this construction, any excess soil adhering to the potatoes which may be sufficient to cause the elevator to engage the forward agitators 315, may be shaken off by the latter before it reaches the rear agitator 325. If such is the case, then the elevator is maintained out of contact with the rear agitating sprockets, and the latter are not brought into operation. If, however, such soil is not by this time removed from the crop, the additional weight thereon causes the elevator to engage the rear agitating sprockets, and will thereupon cause the latter to furnish additional agitation for the elevator so as to remove all soil from the potatoes or other crop being dug. Thus, I have provided automatic agitating means that comes into operation only if agitation is necessary and then only to the extent that it is required. It is also important to note that the automatic agitators are associated with the level portion 80b of the elevator. Where only the shovel unit of the machine is raised or lowered in adjusting the depth of operation while the remainder of the machine remains on a horizontal, the use of gravity actuated automatic agitators is appreciably facilitated, for the greatest efficiency of such agitating means is secured where the elevator remains in substantially constant position. Also, an advantage of the level bed machine is that it is more stable in operation and there is less rolling and bruising of the crop, not only because of the agitation of the crop during the horizontal travel thereof, but also due to the fact that no agitation occurs at any time unless it is necessary. When the potatoes are clear of soil they are more likely to be bruised by rolling or excessive agitation, and according to the principles of the present invention, when the soil has been shaken loose from the potatoes, no further agitation occurs.

While I have shown and described above the preferred construction in which the principles of the present invention have been embodied, it is to be understood that my invention is not to be limited to the specific details shown and described, but, in fact, widely different means may be employed in the practice of the wider aspects of my invention.

What I claim, therefore, and desire to secure by Letters Patent is:

1. A potato digger comprising a substantially horizontal main frame having longitudinally extending frame bars, a shovel unit pivoted to said main frame bars for generally vertical adjustment, ground engaging supporting means connected to support said frame and disposed forwardly of said shovel unit, supporting rollers carried in longitudinally spaced relation on said frame bars and disposed generally in the same horizontal plane, other rollers carried on said shovel unit, a single endless elevator movable over the rollers on said main frame and said shovel and having a major portion carried on the rollers disposed in said horizontal plane and another portion movable with said shovel unit relative to the major portion carried on said main frame, and raising and lowering mechanism carried by the frame substantially directly above said shovel unit and connected with the latter to raise and lower the same.

2. A potato digger comprising a rigid generally horizontally disposed frame adapted to be supported at one end, carrying wheels for supporting the other end of said frame, a pair of arms pivotally connected at their rear ends to said frame and adapted to extend forwardly and downwardly, a shovel carried at the outer ends of said arms, elevator supporting means carried adjacent the pivot axis of said arms, on said frame rearwardly of said axis and on said arms adjacent said shovel, an endless elevator chain movable upwardly from said shovel and then horizontally along said frame from said pivot axis, a rock shaft mounted on said frame above said shovel and operatively connected therewith to raise and lower the same, and means deriving power from said carrying wheels for raising said shovel and the portion of said endless conveyor forward of the supporting means disposed on the pivot axis of said arms.

3. A potato digger comprising a rigid generally horizontally disposed frame adapted to be supported at one end, carrying wheels for supporting the other end of said frame, a pair of arms pivotally connected at their rear ends to said frame and adapted to extend forwardly and downwardly, a shovel carried at the outer ends of said arms, elevator supporting means carried adjacent the pivot axis of said arms, on said frame rearwardly of said axis and on said arms adjacent said shovel, an endless elevator chain movable upwardly from said shovel and then horizontally along said frame from said pivot axis, and deflecting means rigidly connected to said frame at the discharge portion of said endless elevator and disposed in a fixed angular position with respect thereto.

4. A potato digger comprising a substantially horizontal main frame, carrying wheels for supporting at least a portion of the weight of said frame, a shovel unit pivoted to said main frame adjacent the forward portion thereof and extending downwardly and forwardly therefrom, an endless elevator chain supported on said downwardly and forwardly extending shovel unit and extending horizontally rearwardly from the pivot axis of the shovel unit and supported horizontally on said main frame, and means deriving power from said carrying wheels for adjusting the position of the shovel unit.

5. A potato digger comprising a substantially horizontal main frame, a shovel unit pivoted to said main frame adjacent the forward portion thereof and extending downwardly and forwardly therefrom, an endless elevator chain supported on the horizontal portion of said main frame and on said downwardly and forwardly extending shovel unit, a rock shaft supported at the front of said main frame and operatively connected to said pivoted shovel unit for raising and lowering the same and the portion of said elevator chain carried thereby, and means for driving said elevator chain in any adjusted position of said shovel unit comprising a transverse shaft carried at the rear of said main frame and means for driving said shaft including forwardly extending parts supported in position at the forward end of the main frame on said rock shaft.

6. A potato digger comprising a main frame having a generally horizontally disposed section, carrying wheels connected at opposite sides to said frame intermediate the ends thereof and serving to support the principal portion of the weight of said frame, means at the forward end of said frame providing for support of the latter at this point so as to maintain said frame in generally horizontal position at all times, a downwardly and forwardly extending shovel unit pivoted to said frame, an endless elevator chain supported on said pivoted shovel unit and the horizontal portion of said main frame and extending from the shovel of said unit to a point adjacent the rear end of said frame rearwardly of said carrying wheels, means including a rock shaft at the forward portion of said frame above said shovel unit for raising and lowering the latter and the portion of said endless chain supported thereby, and means at the rear end of said frame for driving said endless elevator chain so as to move the upper run thereof from the shovel of said unit upwardly and along the horizontal portion of said main frame.

7. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, and means for agitating the horizontal portion of the upper run of said endless elevator.

8. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, and agitator cams carried by said frame below the horizontal portion of the upper run of said endless elevator and by said movable shovel under the inclined portion of said upper run.

9. A potato digger comprising a main frame, a shovel unit movably connected therewith for generally vertical adjustment, means serving as an arm pivoted to the main frame and operatively connected to be swung about its pivot as said shovel unit moves generally vertically and an adjustable abutment for limiting the movement of said arm means in one direction.

10. In a potato digger, a main frame, a downwardly and forwardly disposed shovel unit pivotally connected to said frame for vertical swinging movement, a rock shaft journaled on said frame and operatively connected with said shovel unit for raising and lowering the same, a stop arm fixed to said rock shaft, and an adjustable stop cooperating with said stop arm on said rock shaft for limiting the downward movement of said shovel unit.

11. In a potato digger, a main frame, a downwardly and forwardly disposed shovel unit pivotally connected to said frame for vertical swinging movement, a rock shaft journaled on said frame and operatively connected with said shovel unit for raising and lowering the same, a stop arm fixed to said rock shaft, a sector movable about the axis of said shaft and having a part serving as an abutment against which said stop arm is adapted to bear, a manually operable member for shifting the position of said sector, and a bracket having arms embracing said stop arm and sector and apertured to receive said rock shaft, said bracket supporting said manually operable member and adapted to engage said frame so as to hold said shiftable sector in adjusted position.

12. In a potato digger, a substantially horizontal main frame, a vertically adjustable elevator section movable relative to said main frame, and deflector plates rigidly fastened to the rear end of said main frame, said deflector plates remaining in position relative to said main frame when said elevator section is moved vertically with respect to the main frame.

13. In a potato digger having a rod elevator, an agitator cam having a toothed periphery and adapted to be rotated by engagement of the rod elevator therewith, said cam being of generally elliptical formation, and means for supporting said cam for rotation about an axis that intersects the minor axis of the cam closer to one edge thereof than to the other so that for each revolution of the cam the associated portions of the elevator are given two major oscillations and two minor oscillations in alternation.

14. An agitator cam for potato diggers and the like, comprising a member of generally elliptical formation and having a journal receiving section disposed on the minor axis of the cam adjacent one edge thereof, and a weighted portion carried by the cam opposite said journal receiving portion so that said cam normally tends to occupy a position with its major axis disposed horizontally below the axis of rotation defined by said journal section.

15. A potato digger comprising a substantially horizontal main frame, a shovel unit pivoted to said main frame adjacent the forward portion thereof and extending downwardly and forwardly therefrom, an endless elevator chain supported on the horizontal portion of said main frame and on said downwardly and forwardly extending shovel unit, a rock shaft supported at the front of said main frame and operatively connected to said pivoted shovel unit for raising and lowering the same and the portion of said elevator chain carried thereby, and means for driving said elevator chain in any adjusted position of said shovel unit comprising forwardly extending parts supported in position at the forward end of the main frame on said rock shaft.

16. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, a stop member operatively connected with said adjustable shovel and movable to different positions with the latter, and means carried by said frame serving as an abutment against which said stop member engages when the adjustable shovel moves downwardly and movable to different positions relative to the frame for holding said stop member in different positions to determine the operating position of said adjustable shovel.

17. In a potato digger, a main frame, a downwardly and forwardly disposed shovel unit pivotally connected to said frame for vertical swinging movement, a rock shaft journaled on said frame and operatively connected with said shovel unit for raising and lowering the same, a stop arm fixed to said rock shaft, a sector movable about the axis of said shaft and having a part serving as an abutment against which said stop arms is adapted to bear, and a manually operable member for shifting the position of said sector.

18. In a potato digger, a main frame, a downwardly and forwardly disposed shovel unit pivotally connected to said frame for vertical swinging movement, a rock shaft journaled on said frame and operative connected with said shovel unit for raising and lowering the same, power lift means for operating said rock shaft to raise and lower the shovel unit, said power lift having a lost motion connection with said rock shaft, and means including a part carried by the rock shaft and another part engageable with said frame for limiting the movement of the rock shaft in one direction.

19. A potato digger comprising a frame, a rod elevator carried thereby, a plurality of pairs of agitator cams mounted on the frame under the crop carrying portion of said elevator, the rear agitators being spaced from said elevator farther than the forward agitators, and an intermediate non-agitating support for said rod elevator between said cams.

20. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, agitator cams normally engageable with the inclined portion of said endless elevator for agitating the latter whenever the latter is driven, means for driving said endless elevator, and additional agitator cams carried by said frame normally below and out of contact with the horizontal portion of the upper run of said endless elevator but engageable by the latter to agitate the same whenever the weight of material on the horizontal portion of the endless elevator is sufficient to carry the latter into engagement with said additional agitator cams.

21. A potato digger comprising a substantially horizontal main frame, a shovel unit pivoted to said main frame for generally vertical adjustment, supporting rollers carried at a plurality of points on the main frame and on said shovel unit, an endless elevator movable over the rollers on said main frame and said shovel and having a portion movable with said shovel unit relative to the portion carried on said main frame, means for driving said endless elevator, and three pairs of agitator cams, one pair being supported by said shovel unit and normally driven by said elevator to agitate the same whenever the elevator is in operation, the second pair of agitator cams being mounted forward of certain of the supporting rollers on the main frame and spaced normally from the elevator, and the third set of agitators cams being disposed rearwardly of said certain rollers and spaced from the elevator a distance greater than the spacing of said second pair of agitator cams, whereby the principal separation of the soil from the potatoes is accomplished by said first set of agitator cams, the second and third sets being operated, respectively, only as the weight of material on the elevator carries the latter into engagement therewith.

22. A potato digger comprising a frame, a rod elevator carried thereby, a plurality of pairs of agitator cams mounted on the frame under the crop carrying portion of said elevator, the rear agitators being spaced from said elevator farther than the forward agitators whereby the agitation of the elevator by said cam is dependent by the amount of material carried by the elevator.

23. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, an axle extending transversely across the horizontal portion of said elevator and connected to said frame, supporting wheels journaled on said axle, and means for agitating the horizontal portion of the upper run of said endless elevator.

24. A potato digger comprising a frame, an adjustable shovel movable relative to said frame, an endless elevator having a major portion supported in horizontal position on said frame and an inclined portion movable with said adjustable shovel for receiving potatoes from the latter and conveying them onto said horizontal portion, an axle extending between the upper and lower runs of said endless elevator and connected to said frame, supporting wheels journaled on said axle, and means for agitating the horizontal portion of the upper run of said endless elevator.

25. A potato digger comprising a substantially horizontal main frame, carrying wheels for supporting at least a portion of the weight of said frame, a shovel unit pivoted to said main frame adjacent the forward portion thereof and extending downwardly and forwardly therefrom, an endless elevator chain supported on the horizontal portion of said main frame and on said downwardly and forwardly extending shovel unit, means including a power shaft disposed longitudinally above the horizontal portion of the elevator chain for driving the latter to elevate potatoes from the shovel unit onto the horizontal portion of the elevator chain, and means deriving power from said carrying wheels for adjusting the position of the shovel unit.

26. A potato digger comprising a main frame having a generally horizontally disposed section, carrying wheels connected at opposite sides to said frame intermediate the ends thereof and serving to support the principal portion of the weight of said frame, means at the forward end of said frame providing for support of the latter at this point so as to maintain said frame in generally horizontal position at all times, a downwardly and forwardly extending shovel unit pivoted to said frame, an endless elevator chain supported on said pivoted shovel unit and the horizontal portion of said main frame and extending from the shovel of said unit to a point adjacent the rear end of said frame rearwardly of said carrying wheels, and means including a power shaft disposed longitudinally above the horizontal portion of the endless elevator chain and connected with the rear portion thereof for driving the elevator chain.

27. A potato digger comprising a main frame, a shovel unit pivoted thereto, a movable elevator chain supported on said main frame and said shovel unit, a rock shaft supported on said main frame and operatively connected to said pivoted shovel unit for raising and lowering the same and the portion of the elevator chain carried thereby, and means for driving said elevator chain in any adjusted position on the shovel unit, comprising a transverse shaft carried at the rear of said main frame and means for driving said shaft including forwardly extending parts supported in position relative to the main frame on said rock shaft.

28. A potato digger comprising a frame including generally horizontally disposed frame bars, a shovel unit pivotally connected at its rear end to said frame bars, means on said shovel unit and said bars for supporting a single continuous elevator chain, the forward portion of which moves with said shovel unit, supporting wheels carrying said frame, and means deriving power from at least one of said supporting wheels for raising said shovel unit and the portion of said elevator chain.

CURTISS L. COOK.